(12) United States Patent  
Dang et al.

(10) Patent No.: US 12,225,498 B2  
(45) Date of Patent: Feb. 11, 2025

(54) METHOD AND APPARATUS FOR SETTING UP AND/OR ADJUSTING BACKHAUL LINK IN MARITIME NETWORK

(71) Applicant: Telefonaktiebolaget LM Ericsson (publ), Stockholm (SE)

(72) Inventors: Yanping Dang, Beijing (CN); Jinhua Liu, Beijing (CN); Bo Zhong, Beijing (CN); Serdar Sahin, Plano, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 429 days.

(21) Appl. No.: 17/635,817

(22) PCT Filed: Aug. 20, 2019

(86) PCT No.: PCT/CN2019/101494  
§ 371 (c)(1),  
(2) Date: Feb. 16, 2022

(87) PCT Pub. No.: WO2021/031101  
PCT Pub. Date: Feb. 25, 2021

(65) Prior Publication Data  
US 2022/0312362 A1    Sep. 29, 2022

(51) Int. Cl.  
*H04W 64/00*    (2009.01)  
*G01S 5/02*    (2010.01)  
(Continued)

(52) U.S. Cl.  
CPC ......... *H04W 64/003* (2013.01); *G01S 5/0289* (2013.01); *H04W 4/023* (2013.01); *H04W 28/0226* (2013.01)

(58) Field of Classification Search  
CPC ... H04W 76/14; H04W 4/02; H04W 28/0226; H04W 4/023; H04W 84/18; H04W 4/46;  
(Continued)

(56) References Cited

U.S. PATENT DOCUMENTS

2002/0169527 A1* 11/2002 Cline ................. G08G 3/00  
701/21  
2008/0117082 A1    5/2008 Su  
(Continued)

FOREIGN PATENT DOCUMENTS

| CN | 108769928 A | 11/2018 |
| CN | 109121085 A | 1/2019 |
| CN | 109195152 A | 1/2019 |

OTHER PUBLICATIONS

Lei, Po-Ruey, et al., "Discovering Maritime Traffic Route from AIS Network", 18th Asia-Pacific Network Operations and Management Symposium, Jan. 6, 2016.

*Primary Examiner* — Brian D Nguyen  
(74) *Attorney, Agent, or Firm* — Sage Patent Group

(57) ABSTRACT

Embodiments of the present disclosure provide methods and apparatuses for setting up and/or adjusting backhaul link in maritime network. A method in a first radio node in a first ship comprises: obtaining a first position and moving information of the first ship; receiving a second position and moving information of a second ship from a second radio node in the second ship; determining whether to connect to the second radio node to form a maritime network, based on radio measurements between the first and second radio nodes, the first position and moving information and the second position and moving information.

18 Claims, 8 Drawing Sheets

(51) Int. Cl.
*H04W 4/02* (2018.01)
*H04W 28/02* (2009.01)

(58) Field of Classification Search
CPC ... H04W 64/003; H04W 84/005; H04W 4/44; H04W 88/04; H04W 92/20; G01S 5/0289; B63B 2203/02
See application file for complete search history.

(56) References Cited

U.S. PATENT DOCUMENTS

| | | | |
|---|---|---|---|
| 2009/0109061 A1* | 4/2009 | McNew | G08G 1/164 340/928 |
| 2013/0190001 A1* | 7/2013 | Guo | H04W 4/02 455/450 |
| 2014/0253375 A1* | 9/2014 | Rudow | G01S 19/485 342/357.51 |
| 2015/0229382 A1 | 8/2015 | Lee et al. | |
| 2017/0230841 A1 | 8/2017 | Rao et al. | |
| 2017/0313269 A1* | 11/2017 | Breed | G01F 23/2962 |
| 2018/0063767 A1* | 3/2018 | Matos | H04W 40/026 |
| 2018/0124631 A1* | 5/2018 | Ramos de Azevedo | H04W 28/0226 |
| 2019/0223237 A1* | 7/2019 | Hong | H04L 63/105 |

* cited by examiner

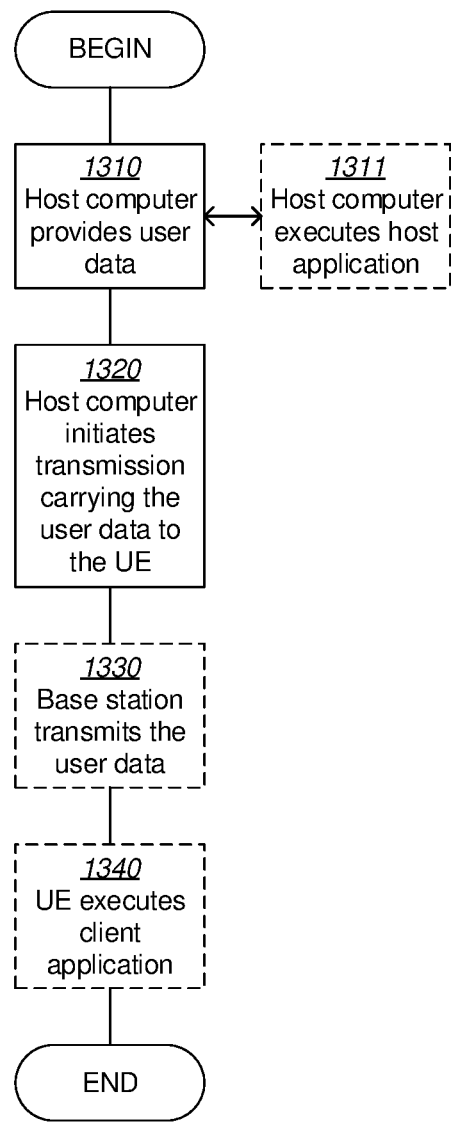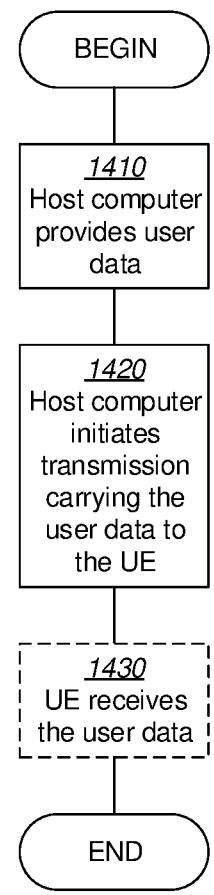
FIG. 8
FIG. 9

METHOD AND APPARATUS FOR SETTING UP AND/OR ADJUSTING BACKHAUL LINK IN MARITIME NETWORK

TECHNICAL FIELD

The non-limiting and exemplary embodiments of the present disclosure generally relate to the technical field of wireless communications for maritime, and specifically to method and apparatus for setting up and/or adjusting backhaul link in maritime network.

BACKGROUND

This section introduces aspects that may facilitate a better understanding of the disclosure. Accordingly, the statements of this section are to be read in this light and are not to be understood as admissions about what is in the prior art or what is not in the prior art.

Traditionally, maritime ships communicate with remote communication devices via terrestrial network when ships are in coverage of terrestrial network, or via satellite networks when the maritime ships are out of reach of the terrestrial network (or in other special conditions). For instance, when out of range of the terrestrial network, machine-to-machine ("M2M") devices on a maritime ship will connect to a base station on the maritime ship, which in turn is connected via a satellite network to a core network somewhere on land. The connection decision is based on the ship's proximity to the terrestrial network.

The satellite network cannot provide high speed services, like file transfer or video. The satellite can only provide basic communication services. Moreover, satellite coverage is not one hundred percent of the earth and satellite signals may be blocked by cloud or structures on board. In addition, the cost for satellite services is relatively high.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

To overcome or mitigate at least one of the above mentioned problems or other problems or provide a useful solution, embodiments of the present disclosure propose a method and apparatus for setting up and/or adjusting backhaul link in maritime network. Some embodiments provide a solution for a first base station or a first relay terminal device in a ship to select a suitable second base station on another ship to set up and/or adjust a backhaul link to form a maritime network which eventually connects to the terrestrial network on land. Some embodiments provide a solution for a second base station to facilitate the selection of backhaul link by the first base station.

In a first aspect of the disclosure, there is provided a method in a first radio node. The method comprises obtaining a first position and moving information of the first ship; receiving a second position and moving information of a second ship from a second radio node in the second ship; determining whether to connect to the second radio node to form a maritime network, based on radio measurements between the first and second radio nodes, the first position and moving information and the second position and moving information.

In an embodiment, the first radio node is a first base station and the second radio node is a second base station.

In an embodiment, the first radio node receives the second position and moving information from the second radio node directly or via a first relay terminal device.

In an embodiment, the first radio node is a first relay terminal device and the second radio node is a second base station.

In an embodiment, the first radio node obtains the second position and moving information from a first base station in the first ship.

In an embodiment, the determining step comprises: deciding to connect to the second radio node when the radio measurements meet a predetermined condition and the first position and moving information and the second position and moving information indicate that the radio measurements meet the predetermined condition for a predetermined time period.

In an embodiment, the deciding step comprises: judging whether the radio measurements meet the predetermined condition; judging whether a moving status of the first ship and the second ship meet a first requirement for the predetermined time period.

In an embodiment, the moving status comprises at least one of: a distance between the first ship and the second ship; a change amount and/or change rate of the distance; a difference between a moving direction of the first ship and a moving direction of the second ship; a change amount and/or change rate of the difference; and a destination.

In an embodiment, the first position and moving information comprises at least one of: a position of the first ship, a moving direction of the first ship, a moving speed of the first ship, and a destination of the first ship and the second position and moving information comprises at least one of: a position of the second ship, a moving direction of the second ship, a moving speed of the second ship, and a destination of the second ship.

In an embodiment, the second position and moving information is received via a Radio Resource Control, RRC signaling procedure or a Media Access Control Control Element, MAC CE.

In an embodiment, the second position and moving information is received periodically.

In an embodiment, the second position and moving information is received via a third radio node in a third ship.

In an embodiment, the method further comprises: predicting a first time when the radio measurements between the first and second radio nodes do not meet a predetermined condition, based on the first position and moving information and the second position and moving information; and prior to the first time, determining whether to connect to a fourth radio node in a fourth ship to replace the second radio node, based on radio measurements between the first and fourth radio nodes, the first position and moving information and a fourth position and moving information of the fourth ship.

In an embodiment, the predicting step comprises predicting a time when a moving status of the first ship and the second ship doesn't meet a first requirement as the first time.

In an embodiment, the method further comprises: for a fifth radio node in a fifth ship, the radio measurements between the first radio node and the fifth radio node meeting a predetermined condition, monitoring a moving status of the first ship and the fifth ship based on the first position and moving information and a fifth position and moving information of the fifth ship; when the moving status does not meet a second requirement, sending a first request to the fifth radio node to adjust frequency of sending the fifth position and moving information.

In an embodiment, the maritime network is connected to a terrestrial network.

In an embodiment, the method further comprises: sending a second request for the second position and moving information to the second radio node and wherein the second position and moving information is received in response to sending the second request.

In a second aspect of the disclosure, there is provided a method in a second radio node in a second ship. The method comprises: obtaining a second position and moving information of the second ship; sending the second position and moving information to a first radio node in a first ship; wherein the second position and moving information is used for determining whether to connect the first radio node to the second radio node to form a maritime network.

In an embodiment, the first radio node is a first base station and the second radio node is a second base station.

In an embodiment, the second radio node sends the second position and moving information to the first radio node directly or via a first relay terminal device.

In an embodiment, the first radio node is a first relay terminal device and the second radio node is a second base station.

In an embodiment, the second position and moving information is used for judging whether a moving status of the first ship and the second ship meet a first requirement for a predetermined time period.

In an embodiment, the moving status comprises at least one of: a distance between the first ship and the second ship; a change amount and/or change rate of the distance; a difference between a moving direction of the first ship and a moving direction of the second ship; a change amount and/or change rate of the difference; and a destination.

In an embodiment, the second position and moving information is sent via a Radio Resource Control, RRC signaling procedure or a Media Access Control Control Element, MAC CE.

In an embodiment, the second position and moving information is sent periodically.

In an embodiment, the second position and moving information is sent via a third radio node in a third ship.

In an embodiment, the method further comprises: receiving a first position and moving information of the first ship from the first radio node; monitoring a moving status of the first ship and the second ship based on the first position and moving information and the second position and moving information; when the moving status does not meet a second requirement, adjusting frequency of sending the second position and moving information.

In an embodiment, the method further comprises: receiving a first request from the first radio node to adjust frequency of sending the second position and moving information;

adjusting the frequency of sending the second position and moving information according to the first request.

In an embodiment, the maritime network is connected to a terrestrial network.

In an embodiment, the second position and moving information comprises at least one of: a position of the second ship, a moving direction of the second ship, a moving speed of the second ship, and a destination of the second ship.

In an embodiment, the method further comprises: when the second position and moving information is changed, sending the changed second position and moving information to the first radio node.

In an embodiment, the method further comprises: receiving a second request for the second position and moving information from the first radio node; and wherein the sending the second position and moving information step is performed in response to the receiving the second request.

In another aspect of the disclosure, there is provided a first radio node. The first radio node comprises a transceiver; a processor; and a memory coupled to the processor, said memory containing instructions executable by said processor, whereby said first radio node is operative to obtain a first position and moving information of the first ship; receive a second position and moving information of a second ship from a second radio node in the second ship; determine whether to connect to the second radio node to form a maritime network, based on radio measurements between the first and second radio nodes, the first position and moving information and the second position and moving information.

In another aspect of the disclosure, there is provided a second radio node. The second radio node comprises a transceiver; a processor; and a memory coupled to the processor, said memory containing instructions executable by said processor, whereby said second radio node is operative to obtain a second position and moving information of the second ship; send the second position and moving information to a first radio node in a first ship; wherein the second position and moving information is used for determining whether to connect the first radio node to the second radio node to form a maritime network.

In another aspect of the disclosure, there is provided a computer program product, comprising instructions which, when executed on at least one processor, cause the at least one processor to carry out the method according to any of the above first to second aspects.

In another aspect of the disclosure, there is provided a computer-readable storage medium storing instructions which when executed by at least one processor, cause the at least one processor to carry out the method according to any of the above first to second aspects.

According to another aspect of the disclosure, there is provided a method implemented in a communication system including a host computer, a base station and a terminal device. The method comprises, at the host computer, providing user data. The method further comprises, at the host computer, initiating a transmission carrying the user data to the terminal device via a cellular network comprising the base station. The base station is to carry out the method according to the first aspect or the second aspect.

According to another aspect of the disclosure, there is provided a communication system including a host computer comprising processing circuitry configured to provide user data and a communication interface configured to forward the user data to a cellular network for transmission to a terminal device. The cellular network comprises a base station having a radio interface and processing circuitry. The base station's processing circuitry is configured to carry out the method according to the first aspect or the second aspect.

According to a another aspect of the disclosure, there is provided a method implemented in a communication system including a host computer, a base station and a terminal device. The method comprises, at the host computer, providing user data. The method further comprises, at the host computer, initiating a transmission carrying the user data to the terminal device via a cellular network comprising the base station. The terminal device is configured to carry out the method according to the first aspect.

According to another aspect of the disclosure, there is provided a communication system including a host computer comprising processing circuitry configured to provide user data and a communication interface configured to forward user data to a cellular network for transmission to a terminal device. The terminal device comprises a radio interface and processing circuitry. The processing circuitry of the terminal device is configured to carry out the method according to the first aspect.

According to another of the disclosure, there is provided a method implemented in a communication system including a host computer, a base station and a terminal device. The method comprises, at the host computer, receiving user data transmitted to the base station from the terminal device. The terminal device is configured to carry out the method according to the first aspect.

According to another aspect of the disclosure, there is provided a communication system including a host computer comprising a communication interface configured to receive user data originating from a transmission from a terminal device to a base station. The terminal device comprises a radio interface and processing circuitry. The processing circuitry of the terminal device is configured to carry out the method according to the first aspect.

According to another aspect of the disclosure, there is provided a method implemented in a communication system including a host computer, a base station and a terminal device. The method comprises, at the host computer, receiving, from the base station, user data originating from a transmission which the base station has received from the terminal device. The base station is configured to carry out the method according to the first aspect or the second aspect.

According to another aspect of the disclosure, there is provided a communication system including a host computer comprising a communication interface configured to receive user data originating from a transmission from a terminal device to a base station. The base station comprises a radio interface and processing circuitry. The base station's processing circuitry is configured to carry out the method according to the first aspect or the second aspect.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 8 is a flowchart illustrating a method implemented in a communication system in accordance with some embodiments;

FIG. 9 is a flowchart illustrating a method implemented in a communication system in accordance with some embodiments;

DETAILED DESCRIPTION

Figure 1:
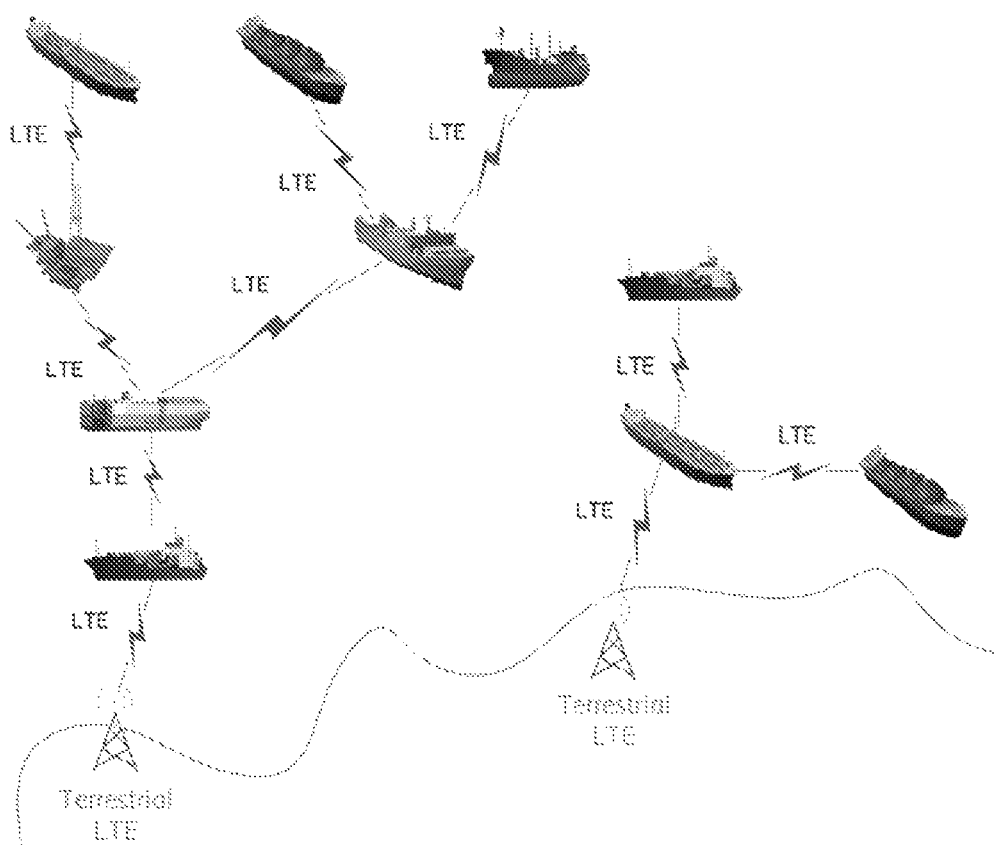
FIG. 1 shows a schematic maritime network connecting to the terrestrial LTE (Long Time Evolution) network.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable communication standards such as the first generation (1G), 2G, 2.5G, 2.75G, 3G, 4G, 4.5G, 5G communication protocols, and/or any other communication standards either currently known or to be developed in the future. In the following description, the terms "network" and "system" can be used interchangeably. Furthermore, the communications between a terminal device and a network node in the communication system may be performed according to any suitable generation communication protocols, including, but not limited to, 1G, 2G, 2.5G, 2.75G, 3G, 4G, 4.5G, 5G communication protocols, and/or any other protocols either currently known or to be developed in the future. In addition, the specific terms used herein do not limit the present disclosure only to the communication system related to the specific terms, which however can be more generally applied to other communication systems.

The term "base station" refers to an access network device in a communication network via which a terminal device accesses to the network and receives services therefrom. For example, the base station (BS) may comprise, but not limited to, an Integrated Access and Backhaul (IAB) node, an access point (AP), a multi-cell/multicast coordination entity (MCE), etc. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

The term "terminal device" refers to any end device that can access a communication network and receive services therefrom. By way of example and not limitation, in the wireless communication network, the terminal device may refer to a mobile terminal, a user equipment (UE), a terminal device, or other suitable devices. The terminal device may be, for example, a Subscriber Station (SS), a Portable Subscriber Station, a Mobile Station (MS), or an Access Terminal (AT). The terminal device may include, but not limited to, a portable computer, an image capture device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a vehicle-mounted wireless device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a UE may represent a terminal device configured for communication in accordance with one or more communication standards for example promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a UE may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

As yet another example, in an Internet of Things (JOT) scenario, a terminal device may represent a machine or other device that performs monitoring and/or measurements, and transmits the results of such monitoring and/or measurements to another terminal device and/or network equipment. The UE may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a UE may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, a downlink, DL, transmission refers to a transmission from a network device such as base station to a terminal device, and an uplink, UL, transmission refers to a transmission in an opposite direction.

As used herein, a radio node could be a base station or a relay terminal device.

It is noted that the terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

The maritime ship can take advantage of other maritime ships in close proximity to create opportunities for more cost effective and efficient communication therebetween and, ultimately, to the terrestrial networks. Additionally, the present invention does not have to take into account national jurisdictions with respect to the location of the maritime ships, and associated potential ad hoc networks, to send and receive information both legally and efficiently.

Maritime network is a network that can be set up by ships themselves. FIG. 1 shows a schematic maritime network connecting to the terrestrial LTE (Long Time Evolution) network. The maritime network consists of multiple base stations each located in a ship. The base stations connect to each other to form a backhaul link to the terrestrial LTE base station on land. On each ship, there is a base station to provide services to local terminal device(s) on the ship and/or to provide services to another base station on another ship as a parent node in the backhaul link. These different services have different requirements and can be spatially multiplexed to reduce interference therebetween. On each ship, there is also a local core network to assist the base station on board to provide local services. In FIG. 1, LTE is only an example to demonstrate mobile communication.

There are two ways to implement the connection of a first base station on a first ship and a second base station on a second ship. The first way is that the first base station owns base station functionality and user terminal functionality, wherein the user terminal functionality can be used to setup radio connection with the second base station in the second ship. The uplink data from the first base station can be transmitted from the first base station to the second base station directly and then maybe a third base station on a third ship, etc, and eventually transmitted to the terrestrial network. The downlink data for the terminal devices in the first ship can be transmitted from the terrestrial network to the second base station via a number of base stations in a number of ships and transmitted from the second base station to the first base station. The first base station forwards the data to the local terminal devices on board.

The second way is that there is a relay terminal device on the first ship. The first base station owns base station functionality only. The first base station or a first local core network on the first ship may identify the relay terminal device, differentiate the data transmitted from the relay terminal device between the uplink data from the relay terminal device itself and the relayed downlink data for the terminal devices in the first ship. The relay terminal device sets up a radio connection with the first base station (and then a first local core network) and a radio connection with the second base station (and then a second local core network). The uplink data from the first base station can be transmitted to the second base station (and eventually to the terrestrial network) via the relay terminal device. The downlink data for the first base station can be transmitted from the second base station to the first base station (and then the local core network on the first ship, and eventually local terminal devices on the first ship) via the relay terminal device.

In this way, a wireless backhaul path to the base station in terrestrial network can be setup for the base stations in different ships and communication information can be relayed to/from terrestrial network. Then, each terminal devices in ships can get access to internet service through their local networks and their ships' communication route.

Then, a technical problem rises, i.e., how to select a suitable base station on another ship as the parent node in the backhaul link from a number of neighboring base stations.

On terrestrial LTE/NR (New Radio) networks, the location of base station is fixed and the network topology is stable. In that case, the evaluation condition of cell selection needs to involve only radio measurements like received reference signal strength, such as CRS (Cell Reference Signal) Reference Signal Receiving Power (RSRP) in LTE or SSB-RSRP in NR. However, the position of a base station on a ship is changing, and network topology is unstable in the maritime network.

For maritime network, a first base station on a first ship needs to select a second base station on a second ship to build up a backhaul path so that the data can be relayed between the first base station and the terrestrial network. As the base stations are moving, the backhaul path may change quite often because a backhaul link may break due to distance change between the two base stations of backhaul link. Such risk increases as the number of hops increases for a the backhaul path. The frequent backhaul path adjustment can cause data loss which cause frequent TCP (Transmission Control Protocol) actions and service interruption. It is necessary to set up and/or adjust backhaul link properly to get a good and stable connection under this challenging environment.

This invention proposes a method to build up/maintain stable backhaul path in maritime network with the relative moving status between the base stations (i.e. ships) taken into considered in addition to the radio parameters such as received signaling strength/quality. Upon selection of parent BS (Base station) for a base station, the candidate BS with estimated slower/smaller distance change and/or direction change in future is prioritized in addition to the received signal strength/quality factor. To do this, the position and moving information of ship is communicated between the radio nodes in different ships.

Figure 2:
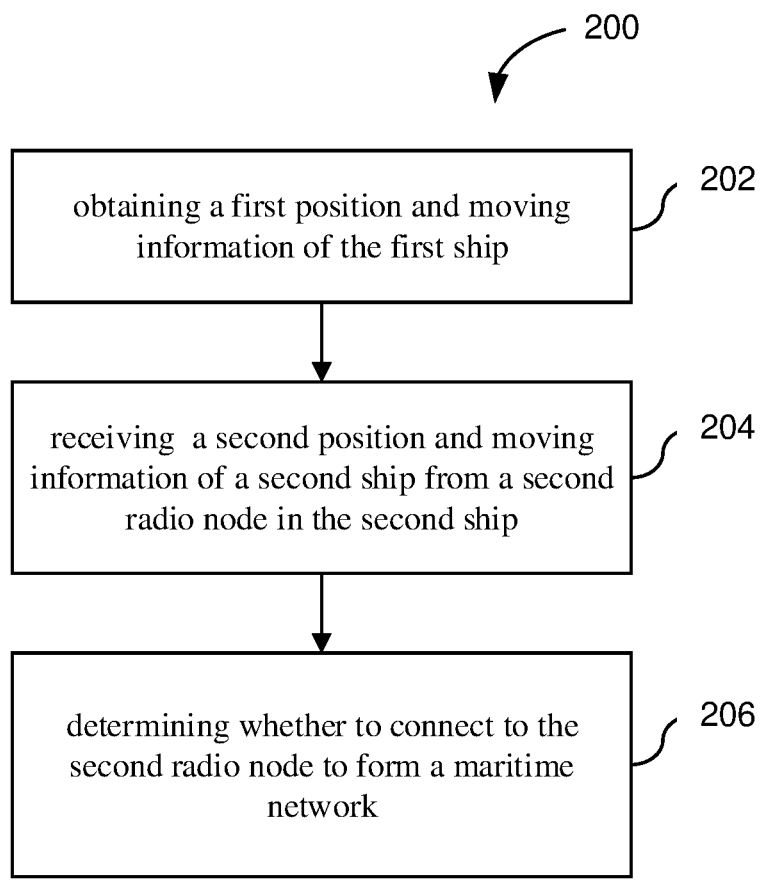
FIG. 2 shows a flowchart of a method according to an embodiment of the present disclosure.

FIG. 2 shows a flowchart of a method according to an embodiment of the present disclosure, which may be performed by an apparatus implemented in or at or communicatively coupled to a radio node or any other entity having similar functionality. As such, the radio node may provide means for accomplishing various parts of the method 200 as well as means for accomplishing other processes in conjunction with other components.

At block 202, the first radio node in the first ship obtains a first position and moving information of the first ship. The first radio node may be a first base station or a first relay terminal device located in the first ship. The first radio node selects the parent node in the backhaul link to the terrestrial network. The first position and moving information of the first ship may be obtained from other device(s) in the first ship, for example, a GPS device, a navigation device, a control device of the first ship and so on. The first position and moving information of the first ship may comprise at least one of: a position of the first ship, a moving direction of the first ship, a moving speed of the first ship, and a destination of the first ship. The first position and moving information can be used for predicting/estimating whether the link with another ship is stable for a certain time in the future.

At block 204, the first radio node receives a second position and moving information of a second ship from a second radio node in the second ship.

The second position and moving information is similar to the first position and moving information, and may be obtained by the second radio node (e.g., a second base station) from other device(s) in the second ship, for example, a GPS device, a navigation device, a control device and so on. The second position and moving information of the second ship may comprise at least one of: a position of the second ship, a moving direction of the second ship, a moving speed of the second ship, and a destination of the second ship. The second position and moving information can be used with the first position and moving information for predicting/estimating whether the link between the first ship and the second ship is stable for a certain time in the future. For the detailed description of use of such information, please refer to the block 206 below.

Note that, here, the second radio node is not limited to one radio node. The first radio node may receive multiple pieces of second position and moving information of multiple second ships from multiple second radio nodes. The first radio node may receive the second position and moving information from the second radio node directly, when the first radio node is embedded with the user equipment function or may receive the second position and moving information from the second radio node indirectly, for example, via a first relay terminal device in the first ship.

In an embodiment, the second position and moving information may be received via a Radio Resource Control, RRC signaling procedure or a Media Access Control Control Element, MAC CE.

In an embodiment, the second position and moving information is obtained by receiving broadcast from the second radio node.

In an embodiment, the second position and moving information is requested and obtained. For example, the first radio node may send a second request for the second position and moving information to the second radio node and the second position and moving information is received in response to sending the second request.

In an embodiment, the second position and moving information may be received periodically.

In an embodiment, the second position and moving information may be received via a third radio node in a third ship. Thus, the position and moving information can be conveyed between neighboring radio nodes via relaying. In this way, the first radio node can get an overall position and moving information of multiple close radio nodes once it connects to a radio node. This reduces the latency and overhead to derive the position and moving information of the neighboring radio nodes one by one.

At block 206, the first radio node determines whether to connect to the second radio node to form a maritime network, based on radio measurements between the first and second radio nodes, the first position and moving information and the second position and moving information.

The first radio node may obtain the second position and moving information from one second radio node and determine whether to connect to the second radio node as a child node of the second radio node. In case that the first radio node obtains multiple pieces of the second position and moving information from multiple second radio nodes, the first radio node may make such determination respectively for each second radio node, or the first radio node may select one second radio node from the multiple second radio nodes by making such determination.

Such determination may be made when there is no connection set up yet for the first radio node or may be made when there is already an active parent node for the first radio node. In the latter case, the first radio node may make such determination to see whether it should replace the current parent node with the second radio node.

Such determination may be made not only based on the radio measurements between the first radio node and the second radio node which can be carried out by routine communication procedures, but also based on the first position and moving information and the second position and moving information.

The use of the first position and moving information and the second position and moving information enhances the determination result making it more robust, reliable, and stable for a relatively long time.

Since the first ship and the second ship(s) are moving all the time, the radio measurements between the first radio node and the second radio node may vary over time. If only radio measurement is taken into consideration, as time pass by, the link between the first radio node and the second radio node may degrade to unacceptable level soon. However, there may another link between the first radio node and another second radio node with acceptable radio measurements for a long time. So the other link should be selected to secure a stable connection. Thus, the first radio node should decide to connect to the second radio node when the radio measurements therebetween meet a predetermined condition and the first position and moving information and the second position and moving information indicate that the radio measurements meet the predetermined condition for a predetermined time period. Here, the predetermined condition and the predetermined time period can be set by those skilled in the art according to experience or requirements.

The basic idea is that the first radio node can select a parent radio node based on joint consideration of the position and moving information and the radio quality information (radio measurements). For instance, when the received radio qualities from multiple second radio nodes are acceptable, the first radio node may select the second radio node with acceptable distance, or similar moving speed/direction.

Figure 3:
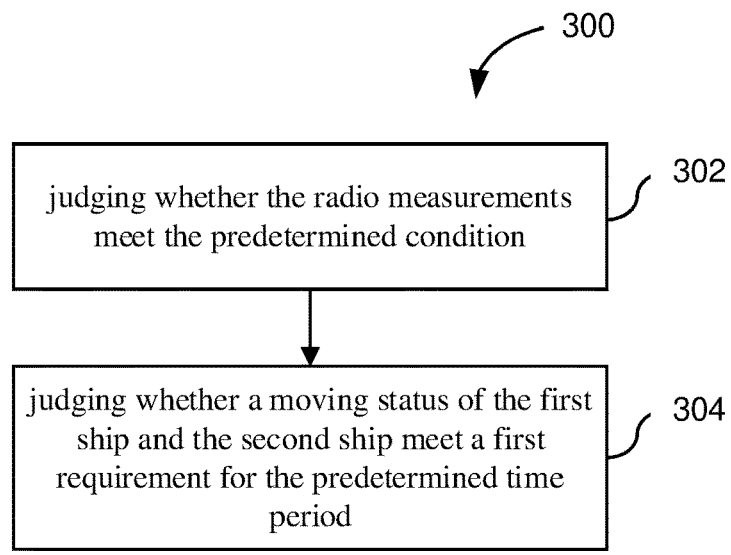
FIG. 3 shows a flowchart of deciding step according to an embodiment of the present disclosure.

In an embodiment, as shown in FIG. 3, the deciding step comprises: judging whether the radio measurements meet the predetermined condition (block 302); and judging whether a moving status of the first ship and the second ship meet a first requirement for the predetermined time period (block 304).

At block 302, the first radio node performs measurements on the channel or the link between the first radio node and the second radio node and compare the measurements with the predetermined condition. The first radio node may obtain multiple candidate radio nodes for further selection at block 304.

At block 304, to see whether the radio measurements can meet the predetermined condition for a predetermined time period, the first radio node judges whether a moving status of the first ship and the second ship meet a first requirement for the predetermined time period. If the moving status of the first ship and the second ship meet the first requirement for the predetermined time period, it is deemed that the radio measurements meet the predetermined condition for a predetermined time period. The link is expected to be stable for at least the predetermined time period.

In an embodiment, the moving status may comprise at least one of: a distance between the first ship and the second ship; a change amount and/or change rate of the distance; a difference between a moving direction of the first ship and a moving direction of the second ship; a change amount and/or change rate of the difference; and a destination. The moving status is predicted based on the position and moving information.

In an embodiment, the first requirement may comprise at least one of: the distance between the first ship and the second ship is less than a first distance threshold; the change amount and/or change rate of the distance is less than a first distance change threshold; the difference between moving speed of the first ship and moving speed of the second ship is less than a first speed threshold; the difference between a moving direction of the first ship and a moving direction of the second ship is less than a first direction difference threshold; the change amount and/or change rate of the difference between moving directions is less than a first difference change threshold; the destination of the first ship and the destination of the second ship are same or along a same ship route; and the difference between the destination of the first ship and the destination of the second ship is less than a first destination distance threshold.

In an embodiment, the first radio node may decide to connect to the second radio node when the radio measurements meet the predetermined condition and a moving status of the first ship and the second ship meet a first requirement for the predetermined time period.

In this way, the first radio node can select a second radio node as parent node with stable link therebetween. In the same way, the second radio node can select its parent node until the parent node is part of terrestrial network. Thus, the links between radio nodes in ships form a maritime network and the maritime network connects to the terrestrial network.

Since the ships are moving, it is rare case that a link can last for the whole route of the ship. When the radio measurements between two radio nodes fail to meet condition for communication, the link will break. This may cause data loss or communication interruption. It will take some time for the first radio node to reconnect to a proper radio node as parent node to set up a link to the terrestrial network.

In an embodiment, the first radio node may predict a first time when the radio measurements between the first and second radio nodes do not meet a predetermined condition, based on the first position and moving information and the second position and moving information. For example, the first radio node may predict a time when a moving status of the first ship and the second ship doesn't meet a first requirement as the first time.

To avoid link interruption, the first radio node may, prior to the first time, perform the method of FIG. 2 to reselect a fourth radio node to replace the second radio node before the link between the first radio node and the second radio node fails. For example, the first radio node may, prior to the first time, receive a fourth position and moving information of a fourth ship from the fourth radio node in the fourth ship and determine whether to connect to the fourth radio node, based on radio measurements between the first and fourth radio nodes, the first position and moving information and the fourth position and moving information. Here, the fourth radio node is not limited to one radio node, and can be multiple fourth radio nodes. In this way, the first radio node can establish a stable link to replace the original link before the original link breaks.

In an embodiment, the first radio node may maintain a set of candidate parent radio nodes and monitor the position and moving information of these parent candidate radio nodes even after the backhaul path is setup. In this way, the selection of a proper second radio node to connect or the selection of a proper fourth radio node to replace the second radio node can be carried out fast, with focus on the set of the candidate parent radio nodes. In an embodiment, the radio measurements of the first radio node and the radio node in the set meet the predefined condition. In an embodiment, the moving status of the first ship and the ship whose radio node is in the set meet the first requirement for the predetermined time period.

In an embodiment, the frequency to communicate the position and moving information depends on the relative distance change rate. When the change is fast between the first radio node and a candidate parent radio node in the set, frequent position and moving information sharing is performed between the two. For one instance, when the first radio node detects that the change of the distance to a candidate parent radio node in the set exceeds a set threshold, the first radio node may request the candidate parent radio node for position and moving information. For another instance, when a second radio node detects that the change of the distance to its child radio node (the first radio node) exceeds a set change threshold, the second radio node may proactively send its position and moving information to the child radio node.

In an embodiment, the first radio node monitors a moving status of the first ship and a fifth ship based on the first position and moving information and a fifth position and moving information of the fifth ship, the radio measurements between the first radio node and a fifth radio node in the fifth ship meeting a predetermined condition. When the moving status does not meet a second requirement, sending a first request to the fifth radio node to adjust frequency of sending the fifth position and moving information. For example, if the distance is long, increase the frequency; if the distance is short, decrease the frequency. In an embodiment, the second requirement may comprise at least one of: the distance between the first ship and the second ship is less than a second distance threshold; the change amount and/or change rate of the distance is less than a second distance change threshold; the difference between moving speed of the first ship and moving speed of the second ship is less than a second speed threshold; the difference between a moving direction of the first ship and a moving direction of the second ship is less than a second direction difference threshold; the change amount and/or change rate of the difference between moving directions is less than a second difference change threshold; the destination of the first ship and the destination of the second ship are same or along a same ship route; and the difference between the destination of the first ship and the destination of the second ship is less than a second destination distance threshold.

Figure 4:
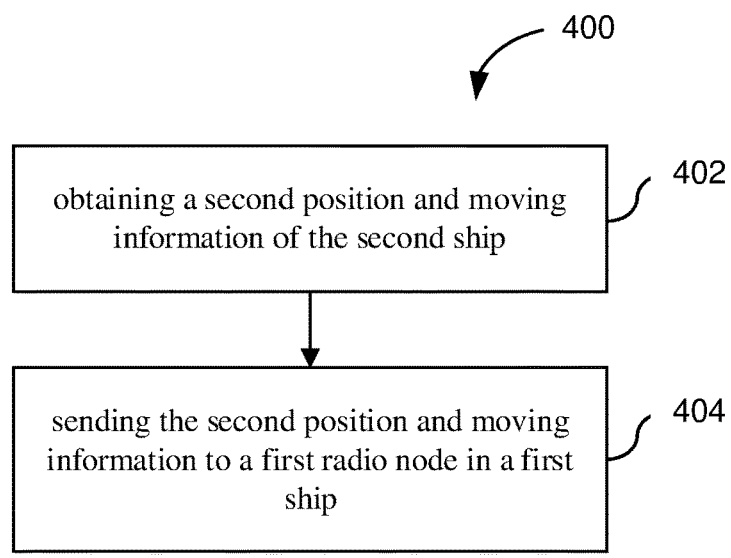
FIG. 4 shows a flowchart of a method according to an embodiment of the present disclosure.

FIG. 4 shows a flowchart of a method according to an embodiment of the present disclosure, which may be performed by an apparatus implemented in or at or communicatively coupled to a second radio node. As such, the radio node may provide means for accomplishing various parts of the method 400 as well as means for accomplishing other processes in conjunction with other components. For some parts which have been described in the above embodiments, detailed description thereof is omitted here for brevity.

At block 402, the second radio node in a second ship obtains a second position and moving information of the second ship. Block 402 is similar to block 202 in FIG. 2.

In an embodiment, the first radio node is a first base station and the second radio node is a second base station.

In an embodiment, the first radio node is a first relay terminal device and the second radio node is a second base station.

In an embodiment, the second position and moving information comprises at least one of: a position of the second ship, a moving direction of the second ship, a moving speed of the second ship, and a destination of the second ship.

At block 404, the second radio node sends the second position and moving information to a first radio node in a first ship; wherein the second position and moving information is used for determining whether to connect the first radio node to the second radio node to form a maritime network.

In an embodiment, the second radio node sends the second position and moving information to the first radio node directly or via a first relay terminal device.

In an embodiment, the second radio node broadcasts its second position and moving information through system information at air interface in LTE/NR networks. Such system information can be broadcasted periodically or in an on-demand style. A neighboring radio node can get the position and moving information when necessary.

In an embodiment, the second position and moving information is used for judging whether a moving status of the first ship and the second ship meet a first requirement for a predetermined time period.

In an embodiment, the moving status comprises at least one of: a distance between the first ship and the second ship; a change amount and/or change rate of the distance; a difference between a moving direction of the first ship and a moving direction of the second ship; a change amount and/or change rate of the difference; and a destination.

In an embodiment, the second position and moving information is sent via a Radio Resource Control, RRC signaling procedure or a Media Access Control Control Element, MAC CE.

In an embodiment, the second position and moving information is sent periodically.

In an embodiment, the second position and moving information is sent via a third radio node in a third ship.

In an embodiment, the maritime network is connected to a terrestrial network.

In an embodiment, when the second position and moving information is changed, e.g. the position/moving speed/moving direction/destination is changed, the second radio node sends the changed second position and moving information to the first radio node. For example, the second radio node may trigger an immediate position and moving information change notification to the connected radio nodes. For instance, it can page the neighboring radio nodes to notify the position and moving information change. For connected radio nodes, an RRC signaling or MAC CE carrying the position and moving information can be used to notify the change. For another instance, the second radio node may send the changed second position and moving information periodically or when amount of the change is larger than a certain threshold.

In an embodiment, the method further comprises: receiving a first position and moving information of the first ship from the first radio node; monitoring a moving status of the first ship and the second ship based on the first position and moving information and the second position and moving information; when the moving status does not meet a second requirement, adjusting frequency of sending the second position and moving information. For instance, when the second radio node detects that the change of the distance to its child radio node (the first radio node) exceeds a set change threshold, the second radio node may proactively send its position and moving information to the child radio node or increase the frequency.

In an embodiment, the method further comprises: receiving a first request from the first radio node to adjust frequency of sending the second position and moving information;

adjusting the frequency of sending the second position and moving information according to the first request.

In an embodiment, the method further comprises: receiving a second request for the second position and moving information from the first radio node; and wherein the sending the second position and moving information step is performed in response to the receiving the second request.

Figure 5:
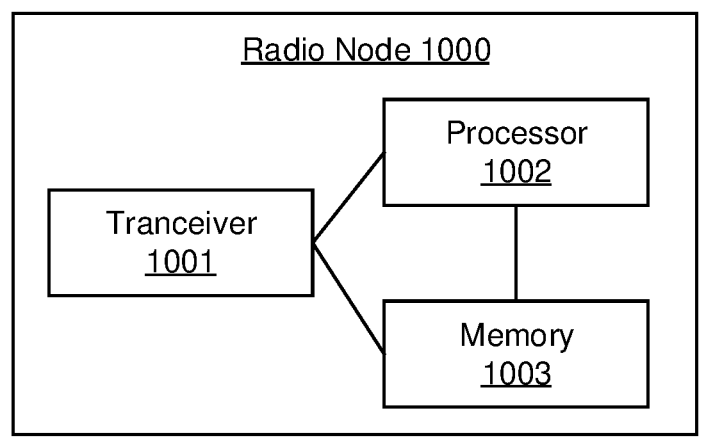
FIG. 5 is a block diagram of a radio node according to embodiments of the present disclosure.

FIG. 5 is a block diagram of a radio node according to embodiments of the present disclosure.

The radio node 1000 includes a transceiver 1001, a processor 1002 and a memory 1003. The memory 1003 contains instructions executable by the processor 1002 whereby the radio node 1000 is operative to perform the actions, e.g., of the procedure described earlier in conjunction with FIGS. 2-4. Particularly, in an embodiment, the memory 1003 contains instructions executable by the processor 1002 whereby the radio node 1000 is operative to: obtain a first position and moving information of the first ship; receive a second position and moving information of a second ship from a second radio node in the second ship; determine whether to connect to the second radio node to form a maritime network, based on radio measurements between the first and second radio nodes, the first position and moving information and the second position and moving information. In an embodiment, the memory 1003 contains instructions executable by the processor 1002 whereby the radio node 1000 is operative to: obtain a second position and moving information of the second ship; send the second position and moving information to a first radio node in a first ship; wherein the second position and moving information is used for determining whether to connect the first radio node to the second radio node to form a maritime network.

In some embodiments, the memory 1003 may further contain instructions executable by the processor 1002 whereby the radio node 1000 is operative to perform any of the aforementioned methods, steps, and processes.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 1002 causes the radio node 1000 to perform the actions, e.g., of the procedure described earlier in conjunction with FIGS. 2-4.

The computer program product may be configured as a computer program code structured in computer program modules. The computer program modules could essentially perform the actions of the flow illustrated in FIGS. 2-4.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

Figure 6:
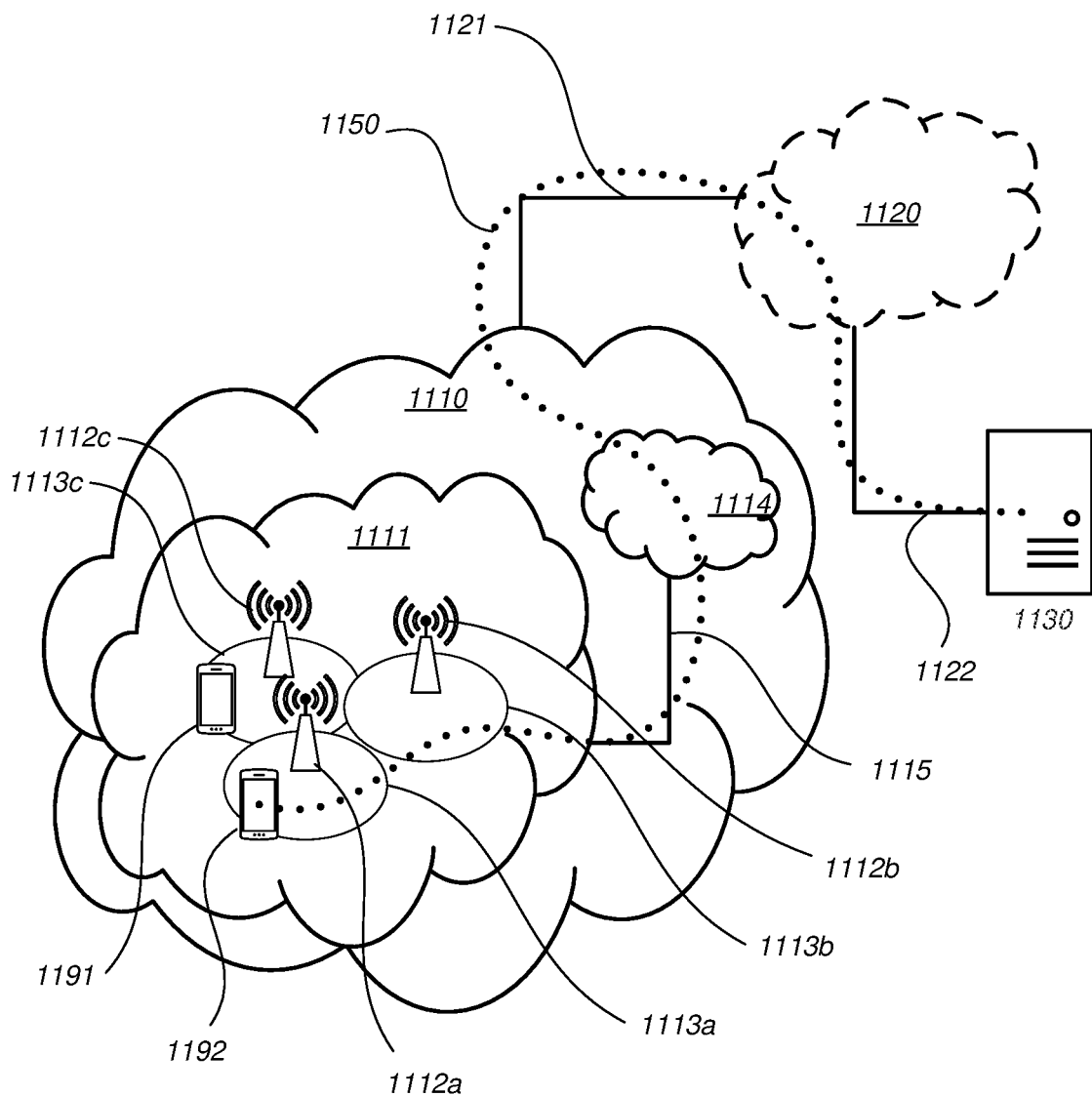
FIG. 6 is a diagram showing a telecommunication network connected via an intermediate network to a host computer in accordance with some embodiments.

With reference to FIG. 6, in accordance with an embodiment, a communication system includes a telecommunication network 1110, such as a 3GPP-type cellular network, which comprises an access network 1111, such as a radio access network, and a core network 1114. The access network 1111 comprises a plurality of base stations 1112a, 1112b, 1112c, such as NBs, eNBs, gNBs or other types of wireless access points, each defining a corresponding coverage area 1113a, 1113b, 1113c. Each base station 1112a, 1112b, 1112c is connectable to the core network 1114 over a wired or wireless connection 1115. A first user equipment (UE) 1191 located in coverage area 1113c is configured to wirelessly connect to, or be paged by, the corresponding base station 1112c. A second UE 1192 in coverage area 1113a is wirelessly connectable to the corresponding base station 1112a. While a plurality of UEs 1191, 1192 are illustrated in this example, the disclosed embodiments are equally applicable to a situation where a sole UE is in the coverage area or where a sole UE is connecting to the corresponding base station 1112.

The telecommunication network 1110 is itself connected to a host computer 1130, which may be embodied in the hardware and/or software of a standalone server, a cloud-implemented server, a distributed server or as processing resources in a server farm. The host computer 1130 may be under the ownership or control of a service provider, or may be operated by the service provider or on behalf of the service provider. The connections 1121, 1122 between the telecommunication network 1110 and the host computer 1130 may extend directly from the core network 1114 to the host computer 1130 or may go via an optional intermediate network 1120. The intermediate network 1120 may be one of, or a combination of more than one of, a public, private or hosted network; the intermediate network 1120, if any, may be a backbone network or the Internet; in particular, the intermediate network 1120 may comprise two or more sub-networks (not shown).

The communication system of FIG. 6 as a whole enables connectivity between one of the connected UEs 1191, 1192 and the host computer 1130. The connectivity may be described as an over-the-top (OTT) connection 1150. The host computer 1130 and the connected UEs 1191, 1192 are configured to communicate data and/or signaling via the OTT connection 1150, using the access network 1111, the core network 1114, any intermediate network 1120 and possible further infrastructure (not shown) as intermediaries. The OTT connection 1150 may be transparent in the sense that the participating communication devices through which the OTT connection 1150 passes are unaware of routing of uplink and downlink communications. For example, a base station 1112 may not or need not be informed about the past routing of an incoming downlink communication with data originating from a host computer 1130 to be forwarded (e.g., handed over) to a connected UE 1191. Similarly, the base station 1112 need not be aware of the future routing of an outgoing uplink communication originating from the UE 1191 towards the host computer 1130.

Example implementations, in accordance with an embodiment, of the UE, base station and host computer discussed in the preceding paragraphs will now be described with reference to FIG. 7. In a communication system 1200, a host computer 1210 comprises hardware 1215 including a communication interface 1216 configured to set up and maintain a wired or wireless connection with an interface of a different communication device of the communication system 1200. The host computer 1210 further comprises processing circuitry 1218, which may have storage and/or processing capabilities. In particular, the processing circuitry 1218 may comprise one or more programmable processors, application-specific integrated circuits, field programmable gate arrays or combinations of these (not shown) adapted to execute instructions. The host computer 1210 further comprises software 1211, which is stored in or accessible by the host computer 1210 and executable by the processing circuitry 1218. The software 1211 includes a host application 1212. The host application 1212 may be operable to provide a service to a remote user, such as a UE 1230 connecting via an OTT connection 1250 terminating at the UE 1230 and the host computer 1210. In providing the service to the remote user, the host application 1212 may provide user data which is transmitted using the OTT connection 1250.

The communication system 1200 further includes a base station 1220 provided in a telecommunication system and comprising hardware 1225 enabling it to communicate with the host computer 1210 and with the UE 1230. The hardware 1225 may include a communication interface 1226 for setting up and maintaining a wired or wireless connection with an interface of a different communication device of the communication system 1200, as well as a radio interface 1227 for setting up and maintaining at least a wireless connection 1270 with a UE 1230 located in a coverage area (not shown in FIG. 7) served by the base station 1220. The communication interface 1226 may be configured to facilitate a connection 1250 to the host computer 1210. The connection 1250 may be direct or it may pass through a core network (not shown in FIG. 7) of the telecommunication system and/or through one or more intermediate networks outside the telecommunication system. In the embodiment shown, the hardware 1225 of the base station 1220 further includes processing circuitry 1228, which may comprise one or more programmable processors, application-specific integrated circuits, field programmable gate arrays or combinations of these (not shown) adapted to execute instructions. The base station 1220 further has software 1221 stored internally or accessible via an external connection.

The communication system 1200 further includes the UE 1230 already referred to. Its hardware 1235 may include a radio interface 1237 configured to set up and maintain a wireless connection 1270 with a base station serving a coverage area in which the UE 1230 is currently located. The hardware 1235 of the UE 1230 further includes processing circuitry 1238, which may comprise one or more programmable processors, application-specific integrated circuits, field programmable gate arrays or combinations of these (not shown) adapted to execute instructions. The UE 1230 further comprises software 1231, which is stored in or accessible by the UE 1230 and executable by the processing circuitry 1238. The software 1231 includes a client application 1232. The client application 1232 may be operable to provide a service to a human or non-human user via the UE 1230, with the support of the host computer 1210. In the host computer 1210, an executing host application 1212 may communicate with the executing client application 1232 via the OTT connection 1250 terminating at the UE 1230 and the host computer 1210. In providing the service to the user, the client application 1232 may receive request data from the host application 1212 and provide user data in response to the request data. The OTT connection 1250 may transfer both the request data and the user data. The client application 1232 may interact with the user to generate the user data that it provides.

Figure 7:
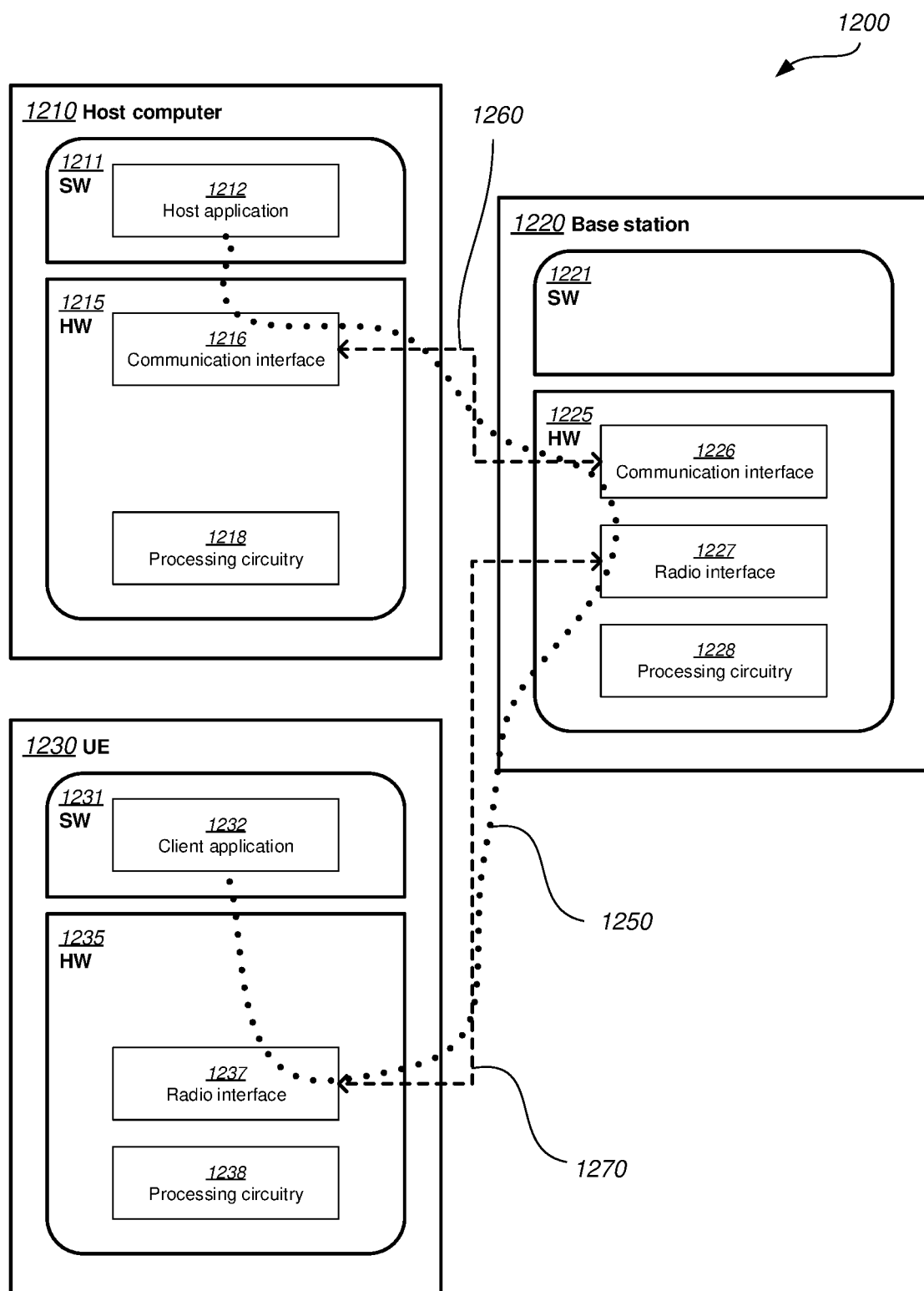
FIG. 7 is a diagram showing a host computer communicating via a base station with a user equipment in accordance with some embodiments.

It is noted that the host computer 1210, base station 1220 and UE 1230 illustrated in FIG. 7 may be identical to the host computer 1130, one of the base stations 1112*a*, 1112*b*, 1112*c* and one of the UEs 1191, 1192 of FIG. 6, respectively. This is to say, the inner workings of these entities may be as shown in FIG. 6 and independently, the surrounding network topology may be that of FIG. 6.

In FIG. 7, the OTT connection 1250 has been drawn abstractly to illustrate the communication between the host computer 1210 and the use equipment 1230 via the base station 1220, without explicit reference to any intermediary devices and the precise routing of messages via these devices. Network infrastructure may determine the routing, which it may be configured to hide from the UE 1230 or from the service provider operating the host computer 1210, or both. While the OTT connection 1250 is active, the network infrastructure may further take decisions by which it dynamically changes the routing (e.g., on the basis of load balancing consideration or reconfiguration of the network).

The wireless connection 1270 between the UE 1230 and the base station 1220 is in accordance with the teachings of the embodiments described throughout this disclosure. One or more of the various embodiments improve the performance of OTT services provided to the UE 1230 using the OTT connection 1250, in which the wireless connection 1270 forms the last segment. More precisely, the teachings of these embodiments may improve the data throughput and thereby provide benefits such as reduced user waiting time.

A measurement procedure may be provided for the purpose of monitoring data rate, latency and other factors on which the one or more embodiments improve. There may further be an optional network functionality for reconfiguring the OTT connection 1250 between the host computer 1210 and UE 1230, in response to variations in the measurement results. The measurement procedure and/or the network functionality for reconfiguring the OTT connection 1250 may be implemented in the software 1211 of the host computer 1210 or in the software 1231 of the UE 1230, or both. In embodiments, sensors (not shown) may be deployed in or in association with communication devices through which the OTT connection 1250 passes; the sensors may participate in the measurement procedure by supplying values of the monitored quantities exemplified above, or supplying values of other physical quantities from which software 1211, 1231 may compute or estimate the monitored quantities. The reconfiguring of the OTT connection 1250 may include message format, retransmission settings, preferred routing etc.; the reconfiguring need not affect the base station 1220, and it may be unknown or imperceptible to the base station 1220. Such procedures and functionalities may be known and practiced in the art. In certain embodiments, measurements may involve proprietary UE signaling facilitating the host computer's 1210 measurements of throughput, propagation times, latency and the like. The measurements may be implemented in that the software 1211, 1231 causes messages to be transmitted, in particular empty or 'dummy' messages, using the OTT connection 1250 while it monitors propagation times, errors etc.

FIG. 8 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 8 will be included in this section. In a first step 1310 of the method, the host computer provides user data. In an optional substep 1311 of the first step 1310, the host computer provides the user data by executing a host application. In a second step 1320, the host computer initiates a transmission carrying the user data to the UE. In an optional third step 1330, the base station transmits to the UE the user data which was carried in the transmission that the host computer initiated, in accordance with the teachings of the embodiments described throughout this disclosure. In an optional fourth step 1340, the UE executes a client application associated with the host application executed by the host computer.

FIG. 9 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 9 will be included in this section. In a first step 1410 of the method, the host computer provides user data. In an optional substep (not shown) the host computer provides the user data by executing a host application. In a second step 1420, the host computer initiates a transmission carrying the user data to the UE. The transmission may pass via the base station, in accordance with the teachings of the embodiments described throughout this disclosure. In an optional third step 1430, the UE receives the user data carried in the transmission.

Figures 10, 11:
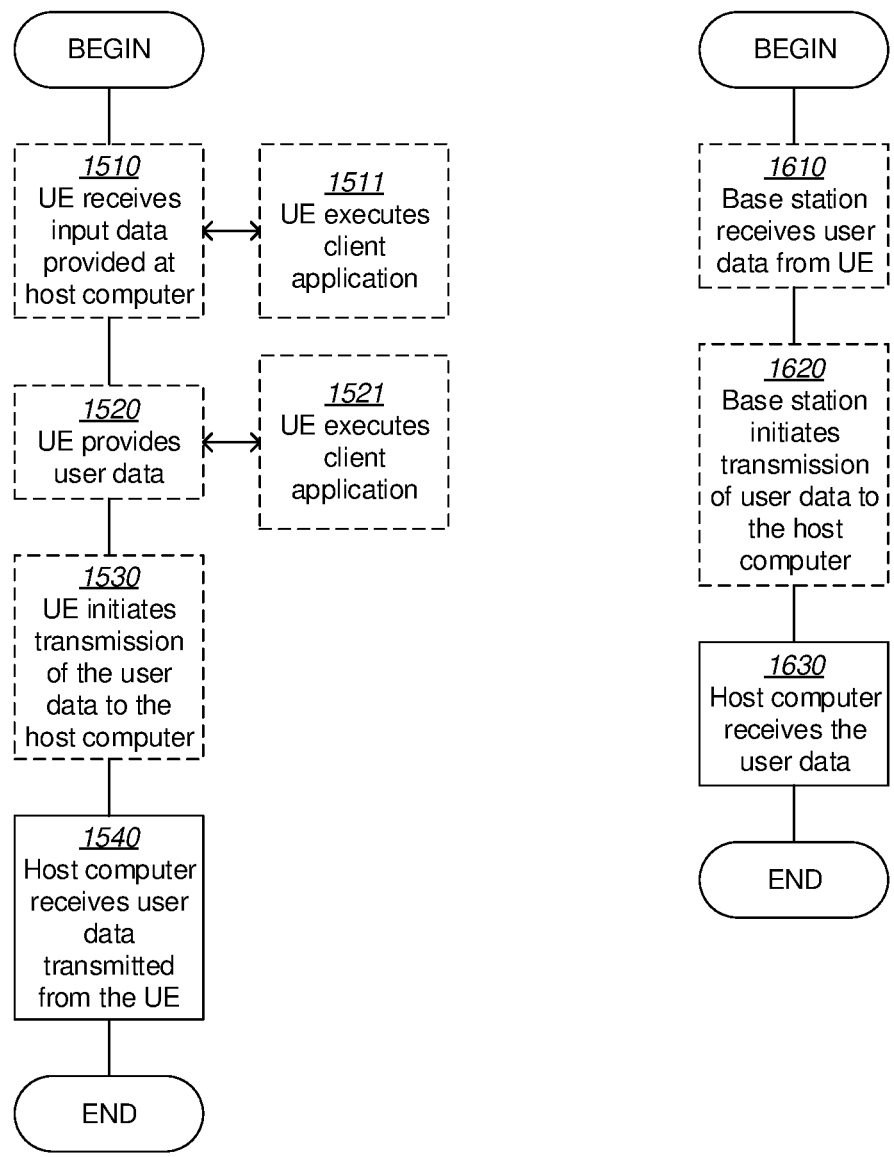
FIG. 10 is a flowchart illustrating a method implemented in a communication system in accordance with some embodiments.
FIG. 11 is a flowchart illustrating a method implemented in a communication system in accordance with some embodiments.

FIG. 10 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 10 will be included in this section. In an optional first step 1510 of the method, the UE receives input data provided by the host computer. Additionally or alternatively, in an optional second step 1520, the UE provides user data. In an optional substep 1521 of the second step 1520, the UE provides the user data by executing a client application. In a further optional substep 1511 of the first step 1510, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1530, transmission of the user data to the host computer. In a fourth step 1540 of the method, the host computer receives the user data transmitted from the UE, in accordance with the teachings of the embodiments described throughout this disclosure.

FIG. 11 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 11 will be included in this section. In an optional first step 1610 of the method, in accordance with the teachings of the embodiments described throughout this disclosure, the base station receives user data from the UE. In an optional second step 1620, the base station initiates transmission of the received user data to the host computer. In a third step 1630, the host computer receives the user data carried in the transmission initiated by the base station.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method in a first radio node in a first ship, the method comprising:
   obtaining a first position and moving information of the first ship;
   receiving a second position and moving information of a second ship from a second radio node in the second ship; and
   determining whether to connect to the second radio node to form a maritime network, based on radio measurements between the first and second radio nodes, the first position and moving information and the second position and moving information, wherein the determining step comprises deciding to connect to the second radio node when the radio measurements meet a predetermined condition and the first position and moving information and the second position and moving information indicate that the radio measurements meet the predetermined condition for a predetermined time period.

2. The method of claim 1, wherein the first radio node is a first base station and the second radio node is a second base station.

3. The method of claim 2, wherein the first radio node receives the second position and moving information from the second radio node directly or via a first relay terminal device.

4. The method of claim 1, wherein the first radio node is a first relay terminal device and the second radio node is a second base station.

5. The method of claim 4, wherein the first radio node obtains the second position and moving information from a first base station in the first ship.

6. The method of claim 1, wherein the deciding step comprises:
   judging whether the radio measurements meet the predetermined condition; and
   judging whether a moving status of the first ship and the second ship meet a first requirement for the predetermined time period.

7. The method of claim 6, wherein the moving status comprises at least one of: a distance between the first ship and the second ship; a change amount and/or change rate of the distance; a difference between a moving direction of the first ship and a moving direction of the second ship; a change amount and/or change rate of the difference; and a destination.

8. The method of claim 1, wherein the first position and moving information comprise at least one of: a position of the first ship, a moving direction of the first ship, a moving speed of the first ship, and a destination of the first ship and the second position and moving information comprises at least one of: a position of the second ship, a moving direction of the second ship, a moving speed of the second ship, and a destination of the second ship.

9. The method of claim 1, wherein the second position and moving information are received via a Radio Resource Control (RRC) signaling procedure or a Medium Access Control Element (MAC CE).

10. The method of claim 1, wherein the second position and moving information are received periodically.

11. The method of claim 1, wherein the second position and moving information is received via a third radio node in a third ship.

12. The method of claim 1, further comprising:
    predicting a first time when the radio measurements between the first and second radio nodes do not meet a predetermined condition, based on the first position and moving information and the second position and moving information;
    prior to the first time, determining whether to connect to a fourth radio node in a fourth ship to replace the second radio node, based on radio measurements between the first and fourth radio nodes, the first position and moving information and a fourth position and moving information of the fourth ship.

13. The method of claim 12, wherein the predicting step comprises predicting a time when a moving status of the first ship and the second ship doesn't meet a first requirement as the first time.

14. The method of claim 1, further comprising:
    for a fifth radio node in a fifth ship, the radio measurements between the first radio node and the fifth radio node meeting a predetermined condition, monitoring a moving status of the first ship and the fifth ship based on the first position and moving information and a fifth position and moving information of the fifth ship; and
    when the moving status does not meet a second requirement, sending a first request to the fifth radio node to adjust frequency of sending the fifth position and moving information.

15. The method of claim 1, wherein the maritime network is connected to a terrestrial network.

16. The method of claim 1, further comprising: sending a second request for the second position and moving information to the second radio node and wherein the second position and moving information is received in response to sending the second request.

17. A method in a second radio node in a second ship, the method comprising:
   obtaining a second position and moving information of the second ship;
   sending the second position and moving information to a first radio node in a first ship; and
   wherein the second position and moving information is used for determining whether to connect the first radio node to the second radio node to form a maritime network, and
   wherein the determining comprises deciding to connect to the second radio node when the radio measurements meet a predetermined condition and the first position and moving information and the second position and moving information indicate that the radio measurements meet the predetermined condition for a predetermined time period.

18. A first radio node, comprising:
   a transceiver;
   a processor; and
   a memory coupled to the processor, said memory containing instructions executable by said processor, whereby said first radio node is operative to:
      obtain a first position and moving information of the first ship;
      receive a second position and moving information of a second ship from a second radio node in the second ship;
   determine whether to connect to the second radio node to form a maritime network, based on radio measurements between the first and second radio nodes, the first position and moving information and the second position and moving information, wherein the determination is based on a decision to connect to the second radio node when the radio measurements meet a predetermined condition and the first position and moving information and the second position and moving information indicate that the radio measurements meet the predetermined condition for a predetermined time period.

* * * * *